United States Patent
Koren et al.

(10) Patent No.: US 6,422,730 B1
(45) Date of Patent: Jul. 23, 2002

(54) FIBER OPTIC LIGHT SOURCE WITH TWO CHAMBER COOLING

(75) Inventors: Pinhas Paul Koren, Altamonte Springs; Roy Archer, Ocoee, both of FL (US)

(73) Assignee: Super Vision International, Inc., Orlando, FL (US)

( * ) Notice: Subject to any disclaimer, the term of this patent is extended or adjusted under 35 U.S.C. 154(b) by 0 days.

(21) Appl. No.: 09/747,570

(22) Filed: Dec. 22, 2000

Related U.S. Application Data
(60) Provisional application No. 60/190,432, filed on Mar. 17, 2000.

(51) Int. Cl.[7] .............................................. F21V 15/00
(52) U.S. Cl. ...................... 362/580; 362/294; 362/551; 361/692
(58) Field of Search ................................ 362/580, 547, 362/294, 373, 551, 264, 218; 355/30; 359/395; 361/690, 692, 695

(56) References Cited

U.S. PATENT DOCUMENTS

| | | | |
|---|---|---|---|
| 1,537,228 A | * 5/1925 | Gargan | ........................ 361/692 |
| 4,704,660 A | 11/1987 | Robbins | |
| 4,782,430 A | 11/1988 | Robbins et al. | |
| 4,825,341 A | 4/1989 | Awai | |
| 4,922,385 A | 5/1990 | Awai | |
| 5,016,152 A | 5/1991 | Awai et al. | |
| 5,295,052 A | * 3/1994 | Chin et al. | ................... 362/294 |
| 5,345,531 A | 9/1994 | Keplinger et al. | |
| 5,416,875 A | 5/1995 | Keplinger et al. | |
| 5,479,322 A | 12/1995 | Kacheria | |
| 5,653,519 A | * 8/1997 | Dobbs | ......................... 362/551 |
| 5,708,749 A | 1/1998 | Kacheria | |
| 5,779,353 A | 7/1998 | Kacheria | |
| 5,813,243 A | * 9/1998 | Johnson et al. | .............. 361/695 |
| 5,838,860 A | 11/1998 | Kingstone et al. | |
| 6,050,715 A | 4/2000 | Hunger | |

* cited by examiner

Primary Examiner—Sandra O'Shea
Assistant Examiner—Bao Truong
(74) Attorney, Agent, or Firm—David G. Maire; Beusse Brownlee Bowdoin & Wolter, P.A.

(57) ABSTRACT

A fiber optic light source having an improved cooling scheme for preventing heat damage to the fiber optic cable input ends. The housing for the light source is divided into two sections, with a separate cooling air supply for each section. The first section is provided with a high volume cooling air flow for general area cooling of the lamp assembly, power supply and other exothermic components. The second section is provided with a high velocity cooling air flow directed at the fiber ends. The second cooling air flow is isolated from the heat generated by the lamp assembly and is provided to the fiber ends at essentially ambient temperature.

12 Claims, 2 Drawing Sheets

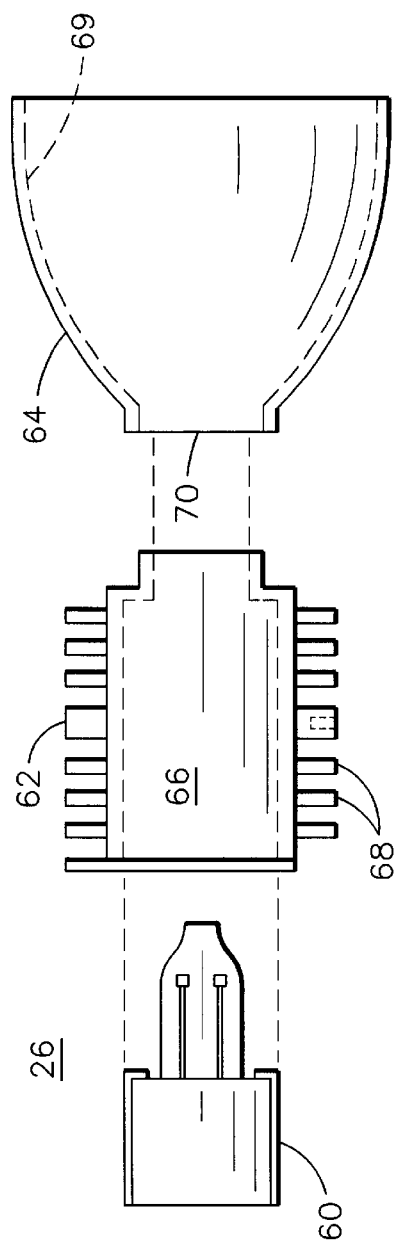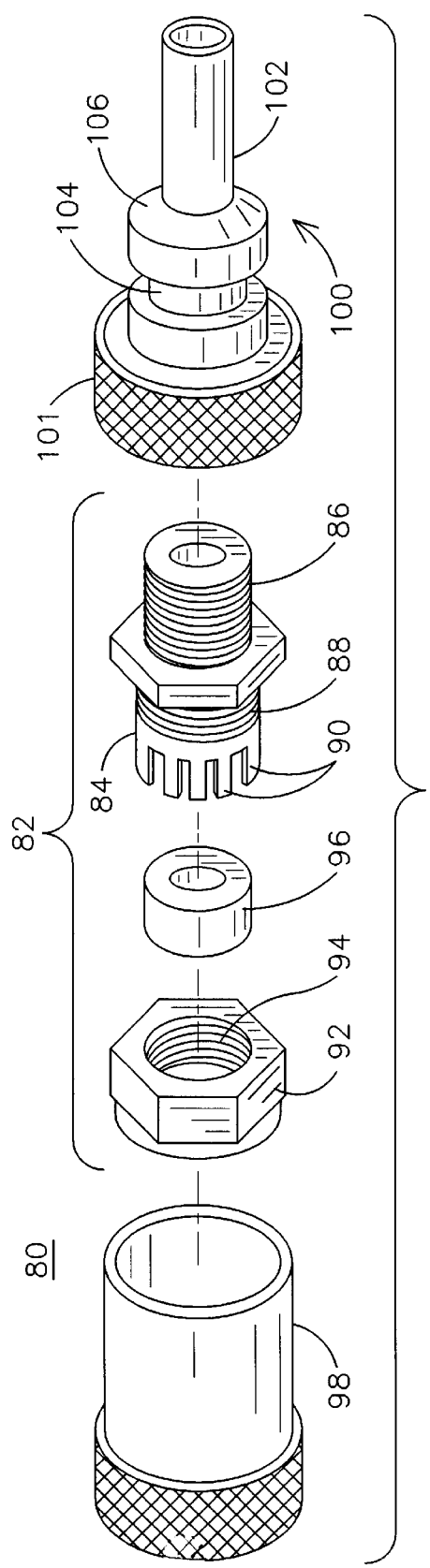

FIBER OPTIC LIGHT SOURCE WITH TWO CHAMBER COOLING

This application claims the benefit of the Mar. 17, 2000, filing date of U.S. provisional patent application No. 60/190, 432.

BACKGROUND OF THE INVENTION

Fiber optic lighting systems are used in a variety of applications to provide a cool, flexible, safe source of light. The assignee of the present invention provides fiber optic light systems for use in signs, displays, swimming pools, landscapes and general area lighting. One such fiber optic light system for providing multi-color light effects is described in U.S. Pat. No. 5,528,714 issued Jun. 18, 1996, to Kingstone et al., assigned to the assignee of the present invention and incorporated by reference herein. A fiber optic lighting system may typically include a light source having a fiber optic cable bundle for transmitting light from the light source to a location remote from the light source. The light source may include an enclosure containing a light bulb, a means for securing the end of a fiber optic cable bundle near the light bulb, a power supply or other electronic equipment, and a fan for providing cooling air to the enclosure.

One of the limiting characteristics of a fiber optic light system is the amount of light that can be delivered from the fiber optic cable. The output of the system depends upon numerous variables, such as the intensity of the light produced by the bulb, the effectiveness of the delivery of the light into the fiber end, and the efficiency of the transmission of the light by the fiber optic cable.

Numerous advances have been made to improve the optical performance of the fiber optic cables themselves. For example, U.S. Pat. No. 5,333,228 issued Jul. 26, 1994, to Kingstone, assigned to the assignee of the present invention and incorporated by reference herein, describes a fiber optic cable having a reflective center core for reflecting inwardly directed emissions back toward the outside surface of the cable.

It is known to increase the amount of light introduced at the inlet end of the fiber optic cable bundle in order to increase the amount of light produced by the system. However, light bulbs used to produce such light, for example incandescent and halogen lamps, produce a significant amount of heat energy along with the visible light energy. As the power of the light bulb is increased, the bulb is placed closer to the ends of the fiber optic cables, and the light is focused onto the fiber ends, it becomes increasingly difficult to provide cooling for the cable ends. It is known that plastic cable fibers will melt at approximately 125 degrees Centigrade. Even local melting of the cable will cause a depression in the cable end, thus causing the cooling air to become stagnant and intensifying the local heating effect. In this manner, even a small local hot spot will quickly destroy the functionality of a cable fiber. Therefore, in order to improve the performance of a fiber optic light source, it is necessary to provide an additional margin of safety against melting of the cable ends. U.S. Pat. No. 5,838,860 issued Nov. 17, 1998, to Kingstone et al., assigned to the assignee of the present invention and incorporated by reference herein, describes the use of a plate of heat absorbing material as part of a temperature control scheme within the enclosure of a fiber optic illumination system. In most designs of fiber optic lighting systems the factor limiting the brightness that can be achieved in the cable is the cooling of the cable ends.

In a light source for a fiber optic system it is necessary to provide both local cooling to the ends of the cable bundle fibers and general cooling for the bulb and other components included in the light source enclosure. The large amount of heat generated by the bulb and other electronics within the enclosure mandates the supply of a high volume of cooling air. However, for cooling the cable end, the volume of air is not as critical as is the velocity of the air, due to the geometry of the cable end and the relatively poor thermal conductivity of the air. In order to provide the required velocity for cooling the fiber end, prior art systems have used fans that are much larger than necessary for the general cooling requirements. As a result, such fans have proven to be noisy and have consumed more electrical power than is necessary for the overall application requirements. Furthermore, prior art fiber optic cable systems incorporating the higher light output of metal halide lamps have been limited. Although these lamps produce more visible light than incandescent and halogen lamps, they also produce more infrared and ultraviolet energy, thereby making it more difficult to provide the necessary cooling to the fiber ends in order to take advantage of these higher output lamps.

Prior art fiber optic light sources generally include an apparatus for positioning a bulb and an associated reflector along an optical axis to direct a beam of light through a lens to the fiber ends. Such an apparatus can be seen in FIG. 2 of the aforementioned U.S. Pat. No. 5,838,860. The reflector design described in that patent is a one piece glass reflector having a generally truncated ellipsoid reflecting portion formed to be integral with a rearward rectangular or rounded base portion. The bulb is typically affixed within the base portion of the reflector with a high temperature adhesive. Therefore, when a bulb fails, it is necessary to replace not only the bulb but also the reflector assembly. The cable ends are held in position by a ferrule assembly that is attached to the light source housing, and the ferrule and reflector are positioned relative to each other by an optical bench.

What is desired is an improved fiber optic lighting system capable of providing a higher level of light intensity. It is an object of this invention to provide an improved fiber optic light source capable of providing high intensity light into the fiber ends without causing damage to the fibers.

It is a further object of this invention to provide such an apparatus with an improved cooling arrangement.

It is a further object of this invention to provide a light source wherein the fiber optic cable can be replaced quickly and without the need for disassembly of the light source housing, while ensuring that the location of the cable ends is held in tight tolerance to a preferred position.

It is a further object of this invention to provide a lower cost apparatus for replacing failed bulbs in a fiber optic light source.

It is a further object of this invention to provide a fiber optic light source that incorporates a metal halide light bulb without the danger of melting of the fiber optic cable bundle ends.

It is yet another object of this invention to provide an efficient and quiet cooling arrangement for a fiber optic cable light source.

SUMMARY OF THE INVENTION

These and other objects, features and advantages of the present invention are provided by an improved light source apparatus and methods that are described in greater detail below. The lighting apparatus described herein includes a housing; a wall disposed within the housing and defining a first interior volume and a second interior volume; a lamp assembly disposed within the first interior volume and adapted to produce a beam of light; a fiber optic cable having an input end disposed within the second interior volume and extending through the housing; a lens forming a portion of the wall and positioned to focus the beam of light onto the fiber optic cable input end; a first fan in fluid communication with the first interior volume for moving a first flow of cooling air from exterior of the housing through the first interior volume; and a second fan in fluid communication with the second interior volume and adapted to move a second flow of cooling air from exterior of the housing through the second interior volume across the fiber optic cable input end, the first flow of cooling air and the second flow of cooling air being isolated from each other within the housing.

BRIEF DESCRIPTION OF THE DRAWINGS

For a better understanding of the present invention, the following detailed description may be taken in conjunction with the accompanying drawings in which:

FIG. 2 is an exploded view of the lamp assembly used in the fiber optic light source of FIG. 1.

FIG. 3 is an exploded view of the fiber cable connector assembly used in the fiber optic light source of FIG. 1.

DETAILED DESCRIPTION OF THE INVENTION

Figure 1:
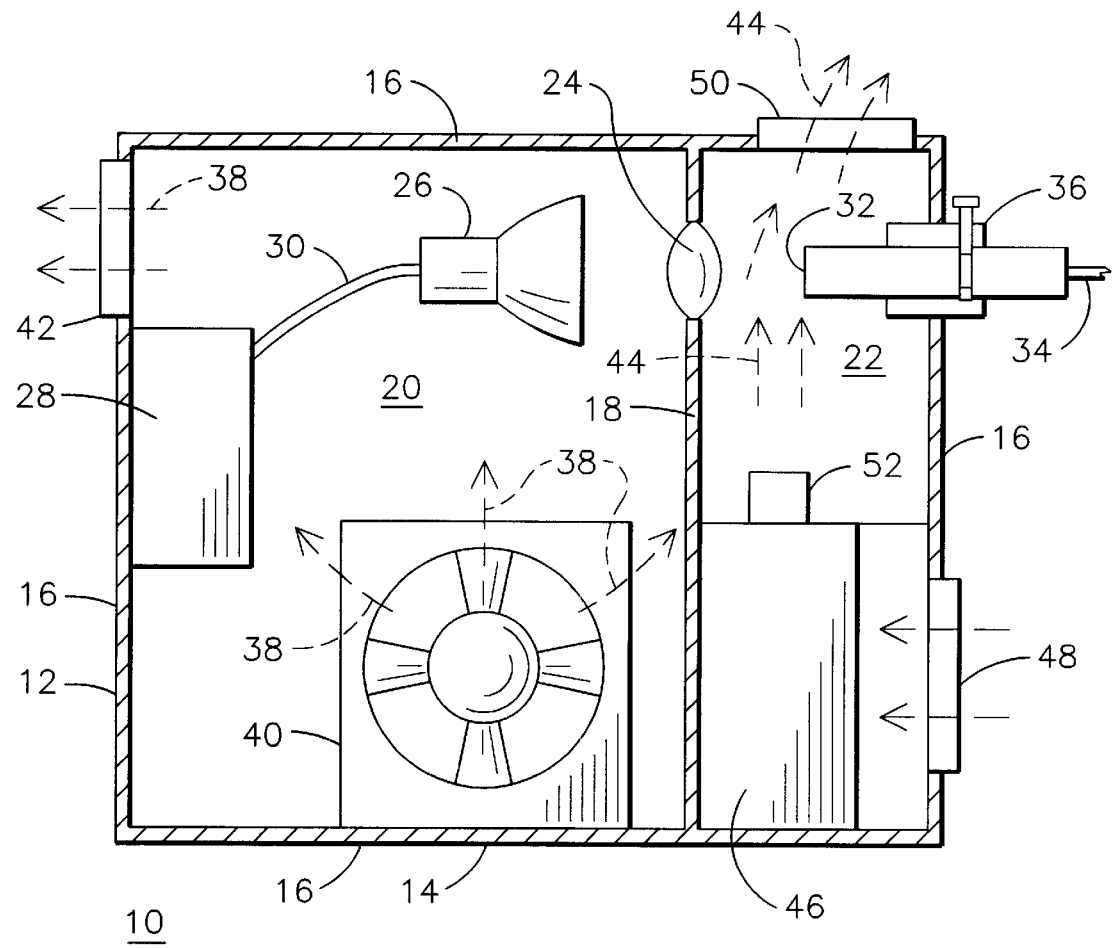
FIG. 1 is a plan view of a fiber optic light source.

The fiber optic light source 10 illustrated in FIG. 1 has a housing 12 including a generally horizontal base 14 mounted on a plurality of feet (not shown), four vertical side walls 16 attached to the base 14 along respective edges, and a top (not shown) generally parallel to the base 14 and removably connected along edges of the side walls 16 opposed the base 14. The housing 12 defines an interior space for the assembly of various other components of the light source 10. A generally vertical interior wall 18 is attached at its respective edges to the base 14, two of the side walls 16, and the top to divide the interior space into a first interior volume 20 and a second interior volume 22 within the housing 12. The housing 12 may be fabricated from sheet metal or other known materials by processes known in the art. Joints between the various portions of the housing 12 are preferably formed to be air tight, such as by soldering, welding, gluing, the use of gaskets, or by forming adjoining portions from a single piece of material. An optical member 24 forms a portion of the interior wall 18 for the purpose of allowing a beam of light to pass from the first interior volume 20 to the second interior volume 22, as will be discussed more fully below.

A lamp assembly 26 is disposed within the first interior volume 20 and may be removably affixed to the base 14 at a predetermined position in alignment with the optical member 24. The lamp assembly 26 receives electrical power from a power supply 28 through a wire 30, also disposed within the first interior volume 20. Lamp assembly 26 produces a beam of light that is directed through optical member 24 toward an input end 32 of a fiber optic cable 34. The input end 32 of fiber optic cable 34 is disposed within the second interior volume 22 and is held at a predetermined position by a connector 36 which supports the fiber optic cable 34 as it extends through one side wall 16 of housing 12.

The heat energy produced by lamp assembly 26, power supply 28 and any other exothermic components that may be located within the first interior volume 20 is removed from the housing 12 by a first flow of cooling air 38. A first fan 40 in fluid communication with the first interior volume 20 produces the first flow of cooling air 38. The first fan 40 may be mounted directly over an opening (not shown) located in the base 14 for drawing air into the first interior volume 20 and across the lamp assembly 26 and other exothermic components. The heated first flow of cooling air 38 is then directed out of the first interior volume 20 through one or more ventilation openings 42 formed in one of the walls 16. One may appreciate that the cooling air inlet and outlet may be located at any convenient locations on housing 12, preferably in locations wherein the heated air is not directly drawn back into the interior of the housing.

Input end 32 of fiber optic cable end 34 is isolated from the first flow of cooling air 38 by interior wall 18, however it will receive a significant amount of thermal energy from the lamp assembly 26 in the form of radiant energy. Optical member 24 may be a lens that focuses the beam of light produced by the lamp assembly 26 onto the input end 32, thereby concentrating the heating effect of the radiant energy. Optical member 24 may be formed to be an infrared filter to lessen the heating effect on the input end 32 of the fiber optic cable 34, however, supplemental cooling is necessary to prevent the overheating of the cable ends. Such cooling is provided by a second flow of cooling air 44, isolated from the first flow of cooling air 38, and produced by a second fan 46 in fluid communication with the second interior volume 22. The second flow of cooling air 44 may be directed into and out of the second interior volume 22 through respective inlet and outlet openings 48,50 formed in the walls 16 or base of the housing 12. In one embodiment, the base 14 may have dividers located along its bottom surface to divide the air space under the housing 12 into four volumes, one each for the respective inlets and outlets of first and second interior volumes 20,22. The position of the various cooling air openings 42, 48, 50 are formed to minimize the mixing of the first 38 and second 48 flows of cooling air outside of the housing 12. The second flow of cooling air 44 need not be a high volume flow, but is preferably a very high velocity flow directed toward and concentrated at the input end 32 of the fiber optic cable 34. A baffle plate or tube 52 may be used to concentrate and direct the second flow of cooling air 44 from the second fan 46 onto the fiber ends. Importantly, because the first and second flows of cooling air 38,48 are isolated from each other within the housing 12, the temperature of the second flow of cooling air 48 as it impacts the input end 32 is essentially at ambient temperature. Prior art devices that utilize a single flow of cooling air for cooling both the lamp and the cable ends have an air temperature directed onto the cable ends that is higher than ambient as a result of mixing of the air within the housing volume. The present invention isolates the second flow of cooling air 48 from the cooling air 38 used to cool the lamp assembly 26. Therefore, a cooler temperature flow of air can be provided at the cable ends than is possible with prior art devices, thereby significantly improving the efficiency of the cooling of the input end 32 of the fiber optic cable 34.

FIG. 2 illustrates an exploded view of the lamp assembly 26 of the fiber optic light source 10 of FIG. 1. The lamp assembly 26 includes a bulb 60, which may be any commercially available high intensity gas discharge lamp, such as a Thorn ArcStream 4000 metal halide lamp. Unlike prior art designs that utilize a one-piece glass reflector assembly, the reflector assembly of the present invention includes a separate metal base portion 62 and a glass reflector portion 64. The base 62 may be machined from metal bar stock, with aluminum being preferred due to its heat transfer properties. Base 62 may have a generally round or rectangular external cross-sectional shape, and includes a central bore opening 66 adapted to receive bulb 60. One or more fins 68 may be formed on the outside diameter surface of the base 62 to improve heat transfer from the base to the first flow of cooling air 38. Reflector 64 is formed of glass and may have a hollow generally truncated ellipsoidal shape with a reflective coating 69 disposed thereon. Reflector 64 may be made thicker than prior art one piece designs which were purposefully made thin to simplify the manufacturing of an integral base and reflector. Reflector 64 includes a bulb opening 70 adapted to align with the bore opening 66 of base 62. Bulb 60 is inserted into base 62 and positioned so that its light emitting electrode discharge will be centered at a focal point of the ellipsoidal reflection surface of reflector 64. Bulb 60 may be attached to base 62 by an ultra high temperature ceramic adhesive such as 904 Zirconia available from Caltronics Corporation in Brooklyn, N.Y. The base 62 may be attached to the reflector 64 with a flexible epoxy such as Duralxo 538 available from Caltronics Corporation. The entire lamp assembly 26 may be provided as a preassembled unit, or only the bulb 60 and base 62 may be preassembled, with the joint between the base 62 and reflector 64 remaining unglued in order to lower the cost of bulb replacement. For such an embodiment, a mounting fixture must be provided within the housing 12 that is capable of holding the base 62 and reflector 64 together in a predetermined position during operation of the light source 10.

The output of lamp assembly 26 is sensitive to the relative positioning of the light-emitting portion of the bulb 60 and the focal point of the reflector 64. Because the location of the light-emitting portion may vary from bulb to bulb, assembly of lamp assembly 26 may be accomplished in a fixture which allows the output of light to be measured as the bulb 60 is adjusted to various positions within the bore opening 66. The bulb 60 is moved to a position providing at least a predetermined amount of light output, or to the position of maximum light output, and the assembly is held in this position until the glue adjoining the pieces has hardened. The inventors have found that such a two-piece base/reflector designs.

FIG. 3 illustrates an exploded view of a connector 80 adapted for attachment to the input end 32 of fiber optic cable 34. The fiber optic cable 34 is not illustrated in FIG. 3, but one may envision the cable 34 inserted through the center openings of the various pieces of connector 80, as will be described in more detail below. Connector 80 includes an internal clamp assembly 82 comprising a hollow double-ended connector 84 having a first threaded end 86 and a second end 88 threaded over a partial extent and having a distal portion containing a plurality of flexible longitudinal fingers 90. A connector cap 92 has internal threads 94 sized for engagement with the threads on the second end 88 of the clamp assembly 82. Connector cap 92 also contains an internal taper (not shown) that compresses the longitudinal fingers 90 onto an inserted fiber optic cable 34 as the connector cap 92 is threaded onto the clamp assembly 82. Elastomeric washer 96 fits within fingers 90 to protect the cable and to distribute the force exerted by the fingers 90. A cover 98 fits over the clamp assembly 82 by a friction fit to protect the various components. A bayonet portion 100 includes internal threads on a first end 101 sized for engagement with the external threads on the first threaded end 86 of the internal clamp assembly 82. The insider diameter of the opposed end portion 102 of bayonet 100 is selected to provided a friction fit with the outside diameter of the inserted fiber optic cable 34.

Assembly of connector 80 onto fiber optic cable 34 is accomplished by sliding each of the respective pieces 98, 92, 96, 84, 100 over an end of the cable 34. Connector cap 92 is threaded onto double-ended connector 84 to provide a compression attachment to the cable 34. Bayonet portion is the threaded onto first threaded end 86 of double-ended connector 84. Cover 98 is slide over double-ended connector 84 to abut the first end 101 of bayonet portion 100. The end of the fiber optic cable 34 which is now protruding out of end portion 102 of bayonet 100 is then cut flush with the end of the end portion 102 to form the input end 32 of cable 34. For plastic cable 34 this cutting step may be accomplished by using a hot knife, as is known in the art.

Figure 4:
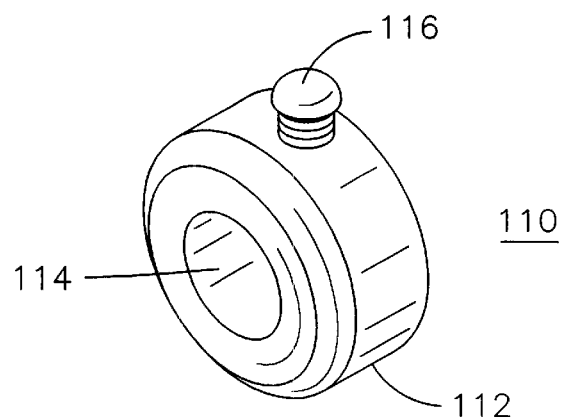
FIG. 4 is a cross sectional view of a collar adapted for quick connecting and disconnecting with the connector of FIG. 3.

FIG. 4 illustrates a collar 110 adapted for installation into an opening in the wall 16 of housing 12 of fiber optic light source 10 and to receive bayonet 100. Collar 110 includes a body 112 having a central opening 114 for receiving the end portion 102 of bayonet 100. The body 112 may be secured into an opening in a side wall 16 of housing 12 by any known mechanism, such as with screws threaded into holes (not shown) formed in the body 112. A spring-loaded pin 116 is retained in an opening formed perpendicular to the central opening 114. Pin 116 is spring biased to protrude into the central opening 114. The pin is sized to fit into a groove 104 formed in the outside surface of bayonet 100 (as seen in FIG. 3) when the bayonet 100 is inserted to a desired position within collar 110. A taper 106 formed on the surface of the bayonet 100 facilitates the retraction of pin 116 as the bayonet 100 is inserted into the collar 110. The diameter of pin 116 is selected to be only slightly smaller than the width of groove 104, for example 0.010 inch smaller, in order to hold the input end 32 of fiber optic cable close to a predetermined position. Similarly, the outside diameter of end portion 102 of bayonet 100 is selected to be only about 0.010 inch smaller than the inside diameter of the central opening 114 of collar 110. In this manner, fiber optic cable 34 can be quickly and accurately inserted into housing 12 to position input end 32 at a desired position with respect to optical member 24 and lamp assembly 26. The fiber optic cable 34 may be withdrawn by simply lifting pin 116 away from bayonet 100 and pulling the bayonet 100 out of collar 110.

Thus, the device described herein provides the capability for higher light output than prior art devices by incorporating a low cost, high intensity metal halide lamp assembly without risk of cable melting, and by ensuring precise alignment of the fiber ends with regard to the lamp assembly while permitting a quick-disconnect fiber cable attachment.

While the invention has been described in what is presently considered to be a preferred embodiment, many variations and modifications will become apparent to those skilled in the art. Accordingly, it is intended that the invention not be limited to the specific illustrated embodiment, but that it be interpreted within the fill scope and spirit of the appended claims.

We claim as our invention:

1. A fiber optic lighting apparatus comprising:

a housing;

a wall disposed within the housing and defining a first interior volume and a second interior volume within the housing;

a lamp assembly disposed within the first interior volume and adapted to produce a beam of light;

a fiber optic cable having an input end disposed within the second interior volume and extending through the housing;

an optical member forming a portion of the wall and positioned to allow a beam of light to pass from the lamp assembly to the fiber optic cable input end;

a first fan in fluid communication with the first interior volume for moving a first flow of cooling air from exterior of the housing through the first interior volume to remove heat generated by the lamp assembly; and a second fan in fluid communication with the second interior volume and adapted to move a second flow of cooling air from exterior of the housing across the fiber optic cable input end, the first flow of cooling air and the second flow of cooling air being isolated from each other within the housing.

2. The apparatus of claim 1, further comprising:

a connector attached to the input end of the fiber optic cable, the connector comprising a groove on its outside surface;

a collar disposed in an opening formed in the housing, the collar adapted to receive the connector therethrough for positioning the input end within the housing;

the collar further comprising a spring loaded pin adapted to fit into the groove when the connector is in a predetermined position.

3. The apparatus of claim 1, wherein the first fan is disposed within the first interior volume and comprises an inlet in fluid communication with a first cooling air inlet opening formed in the housing; and a first cooling air outlet opening formed in the housing.

4. The apparatus of claim 3, wherein the second fan is disposed within the second interior volume and comprises an inlet in fluid communication with a second cooling air inlet opening formed in the housing; and a second cooling air outlet opening formed in the housing.

5. The apparatus of claim 1, wherein the optical member comprises a lens.

6. The apparatus of claim 1, wherein the optical member comprises an infrared filter.

7. The apparatus of claim 1; further comprising:

a collar disposed in an opening in the housing, the collar having a central opening;

a spring loaded pin attached to the collar and adapted to protrude into the central opening;

a connector attached to the input end of the fiber optic cable;

a groove formed on the outside surface of the connector and adapted to received the spring loaded pin when the input end is inserted into the collar to support the input end at a predetermined position relative to the lamp assembly.

8. A fiber optic lighting apparatus comprising:

a lamp;

a first fan adapted to provide a first flow of cooling air to the lamp;

an optical fiber having an end disposed for receiving light from the lamp;

a second fan adapted to provide a second flow of cooling air to the optical fiber end; and a barrier isolating the second flow of cooling air from the first flow of cooling air.

9. The apparatus of claim 8, wherein the barrier comprises a wall dividing an interior of a housing into a first compartment and a second compartment, with the lamp and first fan being disposed in the first compartment, and the optical fiber end and the second fan disposed in the second compartment.

10. The apparatus of claim 9, further comprising an optical member disposed in an opening in the wall for passing light from the lamp to the optical fiber end and for preventing the passage of air between the first and the second compartments.

11. The apparatus of claim 10, wherein the optical member comprises a lens.

12. The apparatus of claim 10, wherein the optical member comprises an infrared filter.

* * * * *